US005734474A

United States Patent [19]

Haecker et al.

[11] Patent Number: 5,734,474

[45] Date of Patent: Mar. 31, 1998

[54] DEVICE FOR DETERMINING THE LOCATION OF INDICATORS

[75] Inventors: Reiner Haecker, Seebach; Klaus Katzmann, Ruhla; Friedhelm Wieg, Seebach; Eberhard Weisheit, Seebach; Juergen Zacharias, Seebach; Hans Pilz, Seebach, all of Germany

[73] Assignee: Helmut Hechinger GmbH & Co., Germany

[21] Appl. No.: 723,514

[22] Filed: Sep. 30, 1996

[30] Foreign Application Priority Data

| | | | |
|---|---|---|---|
| Sep. 28, 1995 | [DE] | Germany | 295 15 478.0 |
| Mar. 27, 1996 | [DE] | Germany | 196 12 103.5 |
| Aug. 8, 1996 | [DE] | Germany | 196 32 011.9 |

[51] Int. Cl.[6] G01B 11/00; G01B 11/14

[52] U.S. Cl. 356/375; 356/372

[58] Field of Search 356/375, 317, 356/318, 326, 331, 332, 334, 373, 372; 250/231.15, 231.17, 231.18, 232, 233, 234, 236

[56] References Cited

U.S. PATENT DOCUMENTS

| | | | |
|---|---|---|---|
| 4,358,753 | 11/1982 | Cascini | 340/347 |
| 4,618,260 | 10/1986 | Okubo | 356/331 |
| 4,700,062 | 10/1987 | Ernst | 250/231 |
| 5,430,693 | 7/1995 | Ganter et al. | 368/47 |
| 5,640,007 | 6/1997 | Talbott et al. | 250/231.15 |

FOREIGN PATENT DOCUMENTS

| | | |
|---|---|---|
| 88 12 431.2 | 3/1990 | Germany . |
| 94 18 446.1 | 3/1995 | Germany . |

*Primary Examiner*—Frank G. Font
*Assistant Examiner*—Michael P. Stafira
*Attorney, Agent, or Firm*—Stein, Pendorf & Van Der Wall

[57] ABSTRACT

There is shown a device for determining the position of moveable indicators via drive gears (1, 2, 3) by means of a reflex light shutter (4, 12) and one through hole (8*a*, 8*b*, 8*c*, 8*d*, 11) provided at least in the drive gear (1, 3) in the beam path of the reflex light shutter (4, 12), in which one or more reflector elements (12) are provided upon a second drive gear (2).

10 Claims, 1 Drawing Sheet

DEVICE FOR DETERMINING THE LOCATION OF INDICATORS

BACKGROUND OF THE INVENTION

1. Field of the Invention

The invention concerns a device for determining the position of indicators moveable by drive gears driven by a drive unit, using a reflex light shutter comprising a light emitter, a light receiver and at least one reflector element, with a first gear wheel which projects into the beam path of the reflex light shutter and which has at least one opening, as well as a measuring or evaluation device coupled to the light receiver.

2. Description of the Related Art

Devices for determining an indicator position by means of reflex light shutters are known for example from the German Utility Patent G 88 12 431.2, and these are employed in connection with appropriately controlled step motors is drivers in particular for mechanical indicators in radio clocks. The devices are thereby so constructed, that light emitters and light receivers of the light shutter are optically coupled with each other only in a particular position of the drive gears, that is, for a particular step of the motor. This arbitrary, but nevertheless always detectable and therewith reproducible gear positioning makes possible the assignment of a particular time indication. It follows that, beginning with this base or starting position, it is possible, even after loss of the current supply or in the case of the original placing of the clock into operation, that the indicator adjustment occurs automatically and precisely.

It is advantageous that an individual particular gear position is detected only then, when for the detection of the gear position intermediate gears are employed having large angular step movement or very small aperture openings. Since the openings cannot be made arbitrarily small it is frequently necessary to provide multiple intermediate gears besides the second, minute and hour gear, that is, additional drive gears in the light path of the light shutter between the drive motor and the second gears or further gears with apertures or slits. This frequently necessitates a construction which for a clock is atypical and expensive.

In the German Utility Model G 94 18 446.1 a device is described, wherein three drive gears are provided with openings or through-holes, wherein light emitter and light receiver are provided on the face side of the gears and a reflector element is securely mounted on the oppositely lying side. In a step of a step motor the light path through all three drive gears is open or closed, wherein during the open light path all three tooth gears assume an exact position. The optic coupling between light emitter and light receiver occurs thereby with inclusion of the stationary reflector element. For recognition of the optical coupling between light emitter and light receiver an appropriate evaluation circuit is provided.

Since the openings are respectively passed through twice by the light beam, the number of drive gears with openings can be reduced keeping the same amount of precision. Beyond this there is as a result of the side mounting of light emitter and light receiver a compact design of the clockwork accomplished. In a reflecting light assembly with rigid reflector element the construction cost is on the one hand less, however, an additional amount of space is required for provision of the reflector elements.

SUMMARY OF THE INVENTION

It is the object of the invention to provide a device for determining the position of indicators, which requires less manufacturing investment and makes possible a compact construction.

By employment of the device according to the invention the mechanical investment is substantially reduced due to a very simple design of the light shutter arrangement. Beyond this, apertures with greater diameter can be employed, which is particularly advantageous in consideration of the following electronic evaluation unit. Foremost however an uneven number of optical couplings are accomplish with high confidence respectively, which makes possible the establishment of intermediate values.

This is made possible thereby, that for determining the position there is used a reflex light shutter with a light emitter, a light receiver and at least one reflector element in communication with a first drive gear which projects into the beam path of the reflex light shutter and which has at least one through-hole. Therewith in accordance with the present invention all of the reflector elements are provided on a second drive gear, wherein respectively by means of the through-holes in the first drive gear and respectively one of the reflector elements in the second drive gear, when in appropriate positions, an optical coupling of the light emitter and light receiver is established via the reflector element and the through holes. The corresponding through holes are transited twice by the light beam. The further processing of the signals given off by the light receiver is accomplished by a evaluation unit.

In an exemplary embodiment of the device according to the invention, numerous through holes of the same shape and size are provided in the first drive gear. The through holes are arranged groupwise on an imaginary circle line which is concentric with the axis of rotation of the first drive gear. Within a group, the offset angle of the through-holes with respect to the particular angles of rotation represent whole-units of a multiple of the smallest discrete step angle of the first drive gear. Through the groupwise arrangement of the through holes it is accomplished that during the step movement and in various positions of the drive gear always at least one of the through-holes is approximately exactly in the center of the optical axis of the light shutter. This position guarantees that an uneven number of evaluatable optical couplings are made available during the step progress through at least one of the through holes. The grouping of the through holes as well as the positioning of the through holes within a group are preferably employed in a species of the invention, but can however in like manner also be employed in communication with the light shutters, which are provided light emitters and light receivers which lie opposite each other or are arranged in other ways.

An enhancement of the precision is additionally achieved thereby, that as well positionally as well as also functionally, that is, within the drive mechanism, between the first and second drive gears, at least one further drive gear with at least one through hole is provided protruding into the beam paths of the light shutter.

Further, the size, shape and position of the further drive gear as well as its through-hole can be designed in such a manner that only one pass of the through-holes of the first drive gear per revolution of the second drive gear results in the establishment of an optical coupling of the light emitter and light receiver. Therewith a definitive determination of the starting position is made possible.

In support thereof, the second drive gear can be provided with only a single reflector element, which registers or coordinates only once in the course of one revolution of the second drive gear with the optical axis of the light shutter. Beyond this, the through-holes of the first drive gear correspond thereby, during the stop phases of the gear movement, sequentially respectively exactly, or with constant deviation, likewise with the optical axis of the light shutter.

It is preferred that, for example, the reflector element(s) of the second drive gear are formed as shiny metal imprints. Thereby with minimal expenditure and high precision a reflector element is realized and positioned. Beyond this, this method of manufacture can in a simple manner be adapted to drive gears made of plastic or synthetic material which are now frequently employed.

For application of the inventive device to clocks, and in particular to radio clocks, the first drive gear is coupled with the seconds indicator and the second drive gear is coupled with the minutes indicator. Therein the second drive gear is preferably provided with a reflector element and the first drive gear is provided with four through-holes which operate as light shutters and are provided in a single grouping. Within this grouping the light shutters, with definite angles of displacement, are positioned next to each other over an angle, preferably of approximately 48° on a circle which is concentric to the middle point of the drive gear. A further drive gear which projects into the beam path is provided with a through hole in the form of a slit aperture and is both structurally as well as functionally positioned or provided between the first and second drive gear. This illustrative embodiment, which may for example be in communication with a step motor, is particularly suitable for use as a drive unit, in particular for radio clocks, and with minimal investure provides for high precision for the determination of the indicator positions.

Finally, the evaluation circuitry establishes or determines preferably, inter alia, the middle value of a number of sequential time points, in which an optical coupling occurs, and then establishes the middle value corresponding drive step as starting position for the adjustment of the position of the drive gears. Thereby with relatively few elements a high precision determination of the position is accomplished.

The invention will now be further explained by means of an illustrative embodiment as shown in the drawings for determining the position of indicators.

DETAILED DESCRIPTION OF THE INVENTION

Figure 1:
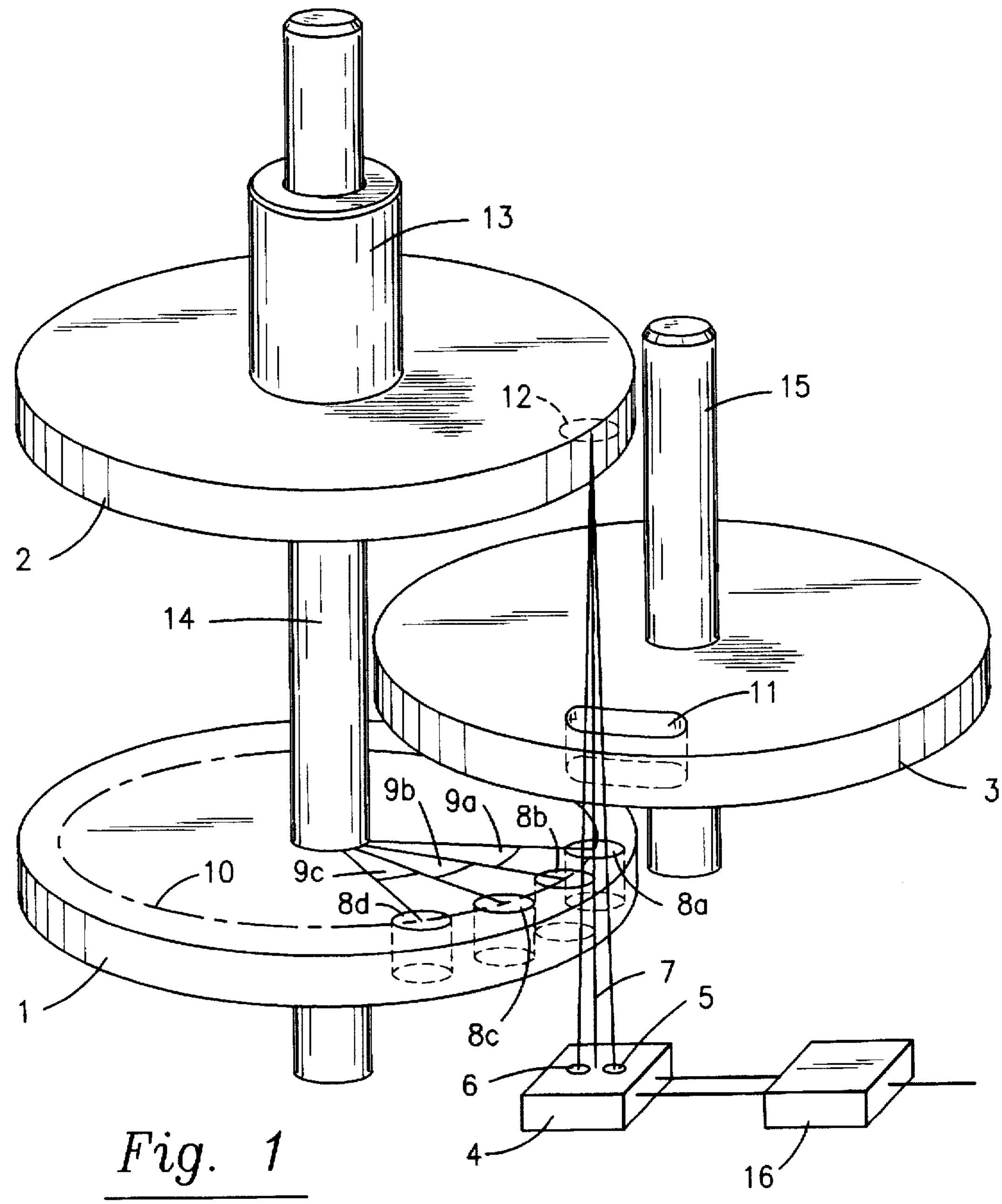
FIG. 1 shows the device for determining the position of indicators, and particularly the reflex right shutter.

In the embodiment according to the invention as shown in the drawing a gear for the clockwork is provided, which is comprised of multiple drive gears. More particularly, there are gears, of which the teeth and interdigitation of the drive gear have been omitted from the drawing for better overview, so that respectively only the gear disks are to be seen. A drive gear fixed to a drive shaft 14 serves as the seconds gear 1, above which a drive gear functioning as the minute gear 2 is fixedly coupled to a shaft 13 concentric to the shaft 14. Between seconds and minute gears 1, 2 there is to be found both in the gear train as well also in the intermediate space an intermediate gear 3 as a drive gear. It is not shown in the figure that the shaft 14 is fixedly coupled with a seconds indicator and the shaft 13 with a minutes indicator. Finally, the intermediate gear 3 is seated on a shaft 15.

On the minutes gear 2 a reflector element 12 is provided, which is formed by means of metal pressing upon the minutes gear 2 made of plastic or synthetic material. The seconds gear 1 includes four through-holes circular in cross-section as light apertures **8*a*, 8*b*, 8*c*, 8*d*, which are arranged in a group next to each other upon an imaginary circle 10 which is oriented concentric to the shaft 14. Beyond this the intermediate gear 3 also is provided with a through hole 11 which is provided as a slit aperture along a section of the circumference of the intermediate gear 3**.

The determination of the angular displacement of the minutes gear 2 and seconds gear 1 is arrived at by means of an opto-electronic reflex coupler 4, wherein the light emitter 5 and the light receiver 6 thereof are provided in a plane. The reflex coupler 4 forms, in combination with the reflector element 12, a reflex light enclosure. The optical axis 7 of the reflex coupler 4 extends beginning from the middle point of the communication path between light emitter 5 and light receiver 6 away and perpendicular to the reflex coupler 4 and essentially parallel to the shafts 13, 14 and 15 of the reflex coupler 4. In a particular positioning of the minutes, intermediate and seconds gears 2, 3, 1 a beam emitted from light emitter 5 passes through one of the four apertures **8*a*, 8*b*, 8*c*, 8*d*—in the illustrative embodiment through the light aperture 8*a* as well as the slit aperture 11, and impinges then upon the reflector element 12, from which the light beam then is reflected back through the slit aperture 11 and the through hole aperture 8*a* to the light receiver 6. The light receiver 6 thereby detects whether the light beam emitted from light emitter 5 is reflected back from the reflector element 12 without interference and therewith establishes an optical coupling between the light emitter 5 and light receiver 6. If the seconds gear 1, minutes gear 2 and/or intermediate gear 3 are not in the proper position, then the light beam is interrupted, and this is accordingly detected by the light receiver 6**.

An evaluation circuit 16 is coupled to the light receiver and measures among other things the intermediate value or average value of sequentially occurring coupling events, and determines a drive step of the gear unit corresponding to this middle-value as a starting position. This starting position is used as a baseline against an exact predetermined value corresponding to a setting or calibration of the gear unit. This type of value is established for example by a time signal receiver. By using an evaluation device 16 then in a suitable manner a step motor not shown in the figure, can be used to bring the gear unit into the desired position.

The four through-hole apertures **8*a*, 8*b*, 8*c*, 8*d*, which are arranged in a group along the imaginary circle 10, have with respect to each other angular displacements 9*a*, 9*b*, 9*c*. These are, with respect to the smallest discrete step angle of the seconds wheel 1, separated by a defined displacement angle and multiple whole units of the smallest discrete step angle. The positioning of the through-hole apertures 8*a*, 8*b*, 8*c*, 8*d* relative to the gearing is not defined. The displacement angle is determined by the mechanical tolerance and the individual components of the gear assembly as well also as the size of the tooth flank backlash of the drive gears. One selects thereby a displacement angle preferably evenly divided between 0° and the half step angle of the seconds wheel 1 in the positive and negative directions. The half step angle of the seconds wheel 1 is generally 3°. The step angle of 6° is produced out of the angle of 360° per revolution as well as the 60 individual steps corresponding to each of the seconds of the seconds wheel 1**.

The apertures **8*a*, 8*b*, 8*c*, 8*d* are positioned, for example, according to the course or sight angle 9*a*=n·6°+1°; 9*b*=n·6°−1°; 9*c*=n·6°−2°; or 9*c*=n·6°+2°. "n" is a whole number and the displacement angle α corresponds, for the aperture hole 8*a*, to exactly 0°, for 8*b* to exactly +1°, for 8*c*** to exactly −1° and for 8*d* either −2° or +2°. The individual displacement angle −α must always be smaller than 3°. By this arrangement it is achieved, that during the step movement and in different positions of the gear unit always at least one of the light apertures 8*a*, 8*b*, 8*c*, 8*d* is arranged nearly or approximately centrally to the optical axis 7. This position guarantees, that an uneven number of evaluatable optical couplings is set up during the step sequence through at least one of the through-hole apertures 8*a*, 8*b*, 8*c*, 8*d*.

After a complete revolution of the seconds gear 1 it is determined, which of the apertures 8*a*, 8*b*, 8*c*, 8*d* delivers an uneven number of optical couplings. Since the angle position of the apertures 8*a*, 8*b*, 8*c*, 8*d* is known, then now by further rotation of the gear mechanism an always identical synchro-position of the seconds gear 1 is established with respect to the minutes gear position. In this reproducible position one achieves the indicator assembly.

In conjunction with one (or more) slit apertures (n) 11 in the intermediate gear 3, it is achieved that only one time during a full revolution of the minutes gear 2 an optical coupling through one of the through-hole apertures 8*a*, 8*b*, 8*c*, 8*d* is possible. The length of the slit aperture 11 must be selected accordingly thereto. Besides this the seconds gear 1, intermediate gear 3 and minutes gear 2 must be exactly aligned to each other in the position in which the optical coupling occurs. Since these three gears 1, 2, 3 are coupled by gear interdigitation, the gear assembly orientation of the aperture system with respect to each other and in respect to the optical axis 7 up to the to be expected angular divergences as a result of, for example, slack or play in the tooth, remains in tact. Therewith a high reproducibility of the synchro-position is accomplished, although the device achieves an exact reflex light aperture system corresponding to a gear step in a nonconventional manner.

What is claimed is:

1. Device for determining the position of indicators moveable by a drive unit via drive gears (1, 2, 3) comprising:

a reflex light shutter (4, 12) comprising a light emitter (5), a light receiver (6) and at least one reflector element (12), wherein light emitted by said light emitter (5) is reflected to said light receiver (6) by said reflector element (12) along a beam path, a first drive gear (1) which projects into said beam path of said reflex light shutter (4, 12), said first drive gear (1) having multiple through holes (8*a*, 8*b*, 8*c*, 8*d*) of identical shape and size grouped along a segment of a circle which is concentric to the axis of rotation of the first drive gear (1), wherein within the group the angular displacements (9*a*, 9*b*, 9*c*) of the through holes (8*a*, 8*b*, 8*c*, 8*d*) are whole unit multiples of the smallest discrete step angle of the first drive gear (1);

a second drive gear (2), wherein said at least one reflector element (12) is provided upon said second drive gear (2); and an evaluation unit (16) coupled to the light receiver (6);

wherein an optical coupling is established between said light emitter (5) and light receiver (6) through respectively one through-hole in the first drive gear (1) and respectively one reflector element (12) on the second drive gear (2) when said drive gears (1, 2) are in a certain position.

2. Device according to claim 1, wherein at least one further drive gear (3) projects both structurally and functionally into the beam path between the first and second drive gear (1, 2) and provided with at least one through hole (11).

3. Device according to claim 2, wherein the size, shape, and position of said further drive gear (3) and the through-hole (11) thereof are designed so that an optical coupling of the light emitter (5) and light receiver (6) through the through holes (8*a*, 8*b*, 8*c*, 8*d*) of the first drive gear (1) occurs at only one position per revolution of the second drive gear (2).

4. Device according to claim 1, wherein in the second drive gear (2) a single reflector element (12) is provided, which is in alignment with the optical axis of the reflector light shutter (12, 4) once in the course of a rotation movement of the second drive gear (2).

5. Device according to claim 1, wherein said through holes (8*a*, 8*b*, 8*c*, 8*d*) of said first drive gear (1), when said first drive gear is in the stop phases of gear movement, sequentially correspond with the optical axis of the reflex light shutter (4, 12) respectively, either precisely or with constant displacement.

6. Device according to claim 1, wherein said reflector element(s) (12) is provided as a shiny metal imprint upon the second drive gear (2).

7. Device according to claim 1, wherein said first drive gear (1) is coupled with a seconds indicator and said second drive gear (2) is coupled with a minutes indicator.

8. Device according to claim 7, wherein said second drive gear (2) is constructed as a reflector element (12) and said first drive gear (1) is provided with four through-holes (8*a*, 8*b*, 8*c*, 8*d*) serving as through hole apertures and arranged next to each other in a group on a segment of a circle separated from each other with a defined displacement angle, wherein said displacement angle is a whole number multiple of the smallest discrete step angle of said first drive gear (1), and that a further drive gear (3) has a through hole (11) formed as a slit aperture and both structurally as well as also functionally is provided between the first and second drive gears (1, 2), in the beam path of the reflex light shutter (4, 12).

9. Device according to claim 8, wherein said through holes (8*a*, 8*b*, 8*c*, 8*d*) are positioned next to each other over an angle of approximately 48° on a circle which is concentric to the middle point of the drive gear.

10. Device according to claim 1, wherein the evaluation circuit (16) determines the average value of the number of sequentially occurring occurrences of optical coupling between light emitter (5) and light receiver (6) and establishes a step movement corresponding to the average value of the starting position of the adjustment of setting of the drive gear unit.

* * * * *